United States Patent [19]
Bruette et al.

[11] Patent Number: 5,828,419
[45] Date of Patent: Oct. 27, 1998

[54] METHOD AND APPARATUS FOR GENERATING TELEVISION PROGRAM GUIDES UTILIZING ICONS

[75] Inventors: Jeff Bruette, Germantown; Matthew Mohebbi, North Potomac, both of Md.; Henry Forson, Annandale, Va.

[73] Assignee: Hughes Electronics, Los Angeles, Calif.

[21] Appl. No.: 608,912

[22] Filed: Feb. 29, 1996

[51] Int. Cl.$^6$ .................................................. H04N 5/445
[52] U.S. Cl. ........................ 348/563; 348/569; 348/906
[58] Field of Search .................... 348/563, 564, 348/569, 589, 600, 601, 906; H04N 5/445, 5/50, 9/74, 9/76

[56] References Cited

U.S. PATENT DOCUMENTS

| | | | |
|---|---|---|---|
| 5,353,121 | 10/1994 | Young | 348/563 |
| 5,585,866 | 12/1996 | Miller | 348/906 |
| 5,592,551 | 1/1997 | Lett | 348/906 |
| 5,594,509 | 1/1997 | Florin | 348/906 |
| 5,635,989 | 6/1997 | Rothmuller | 348/563 |

*Primary Examiner*—Sherrie Hsia
*Attorney, Agent, or Firm*—Wanda Denson-Low; John T. Whelan

[57] ABSTRACT

An apparatus for generating an on-screen television program guide. The apparatus generates a program guide including program source information and program event information for a plurality of program sources. The apparatus also generates and displays icons adjacent the program event information that represent a match between content information for a program event and selection criteria entered by a viewer.

14 Claims, 3 Drawing Sheets

PROGRAM GUIDE            MON, FEB 5 · 2:17PM
COMPLETE · FAV.C ( MAIN MENU )  ( CATEGORY )    ( LIST )  ( GUIDE )  ( CLASS )

| TODAY | 2:00 PM | 2:30 PM | 3:00 PM |
|---|---|---|---|
| A&E 221 | COLUMBO | COLUMBO | |
| BRAV 258 | SOUTH BANK SHOW | NATIONAL ARTS CALENDAR | MACBETH |
| CRT 203 | DAYTIME SESSION | | |
| DTV 100 | DIRECT TICKET PREVIEWS | | |
| HGTV 214 | DECORATING WITH STYLE | AWESOME INTERIORS | ROOMS FOR IMPROVEMENT |
| MAX 973 | 🔒 CURLY SUE | 🔒 REGARDING HENRY | |
| NBC 284 | MAURY POVICH | | SALLY JESSE RAPHAEL |

METHOD AND APPARATUS FOR GENERATING TELEVISION PROGRAM GUIDES UTILIZING ICONS

BACKGROUND OF THE INVENTION

1. Field of the Invention

The present invention relates generally to a subscription television system, and more particularly, to a method and apparatus for generating a user interface for television program guides.

2. Description of the Prior Art

As the subscription television industry has grown, providers of subscription television continually offer more and more channels to the individual subscriber. Typical systems offer more than 100 different channels. Such systems also typically display a channel or program guide, which identifies all available channels and the programs currently airing and upcoming programs on the associated channel. FIG. 1 of U.S. Pat. No. 5,353,121 (the '121 patent), which is herein incorporated by reference, illustrates a typical program guide.

Most known systems also provide the viewer with censorship controls, which allow the viewer to prevent, for example, children, from watching certain channels or programs. The viewer simply identifies channels and/or specific programs to be blocked (i.e., restricted from viewing), and then the system either deletes the program entry from the program guide such that it cannot be selected, or upon tuning to the blocked program notifies the viewer that the program has been restricted from viewing.

The foregoing methods of notifying the viewer that a program has been restricted from viewing results in various problems. First, by completely deleting the program entry or channel from the program guide, the viewer or subscriber has no means, other than his/her own memory, of identifying the restricted programs without having to cancel all restriction criteria so the complete guide will be displayed. As a result, while a given program may be unsuitable for children, it may be quite desirable for adults. Yet, the program guide will fail to notify the viewer that the program is available (i.e., if the viewer fails to remember the program was placed on the restricted list, nothing in the program guide will indicate the availability of the program). Second, notifying the viewer that a program is restricted only when the viewer tunes to the desired program can quickly become a frustrating task.

Accordingly, there exists a need for a program guide which allows the viewer to easily and readily identify if a given program or channel has been restricted from viewing.

SUMMARY OF THE INVENTION

The present invention provides a program guide which satisfies the aforementioned needs. Specifically, the present invention provides a program guide which indicates, by the use of icons, when a given program or channel has been restricted from viewing.

The present invention relates generally to an apparatus for generating an on-screen television program guide. The apparatus comprises means for generating a program guide which comprises program source information and program event information for a plurality of program sources; and means for generating icons to be displayed adjacent the program event information. The icons function to represent a state of a user-selectable option.

As described in detail below, the apparatus of the present invention provides important advantages over the prior art.

Most importantly, in an exemplary embodiment, the present invention allows the viewer to readily and easily identify if a program or channel has been restricted from viewing. As a result, the viewer has ready access to all available programs, and can modify the restricted access list if he/she desires to view a restricted program.

The invention itself, together with further objects and attendant advantages, will best be understood by reference to the following detailed description, taken in conjunction with the accompanying drawings.

BRIEF DESCRIPTION OF THE DRAWINGS

FIG. 2 illustrates an exemplary program guide produced in accordance with the present invention.

DETAILED DESCRIPTION OF THE DRAWINGS

Figure 1:
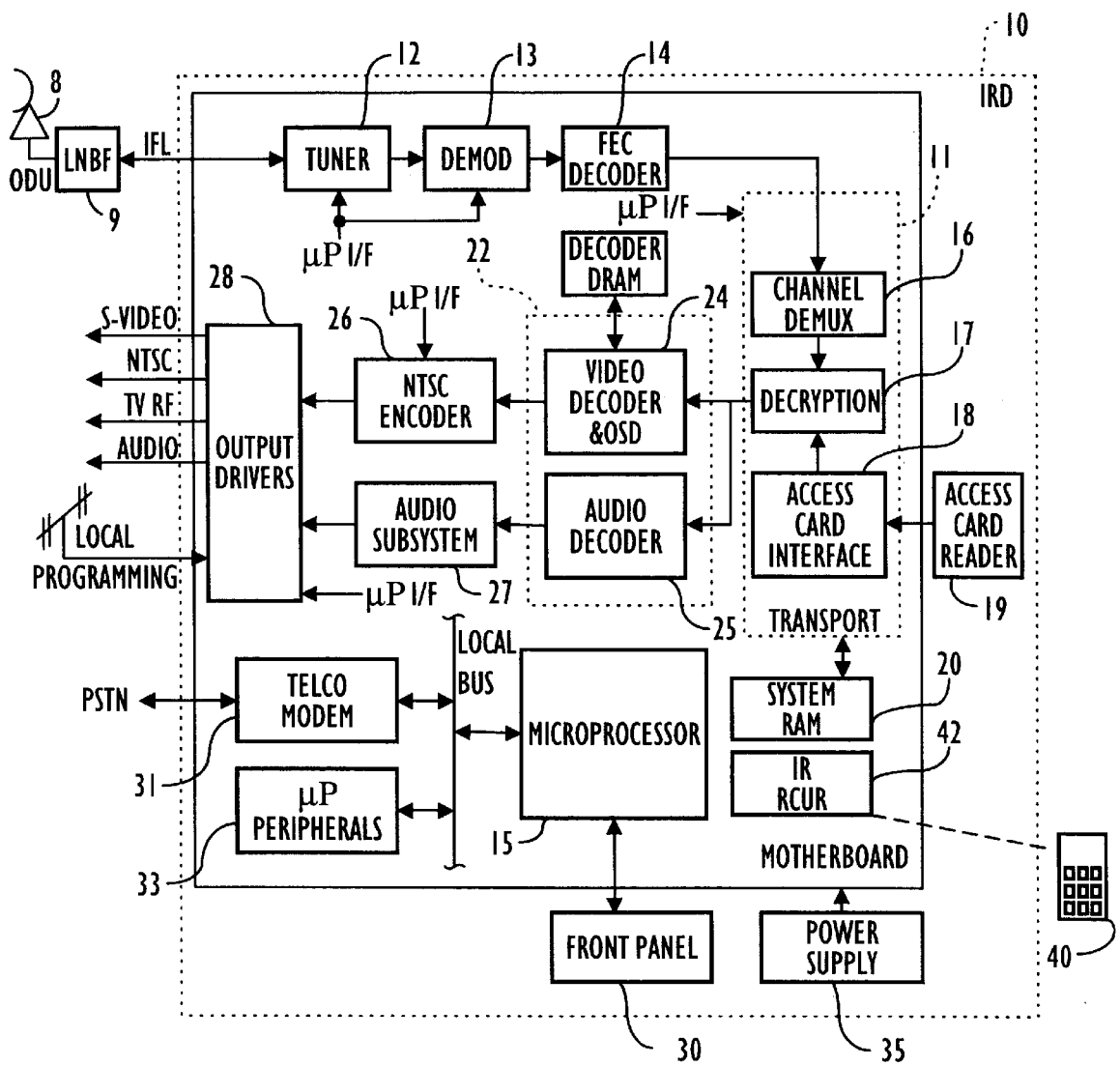
FIG. 1 is a functional block diagram of one embodiment of the terminal device of the present invention.

FIG. 1 is a functional block diagram of one embodiment of the terminal device 10 of the present invention. As shown in FIG. 1, the terminal device 10 includes receiving means comprising tuner 12, demodulator 13 and FEC decoder 14. The receiving means is controlled by microprocessor 15, and operates to receive a signal which includes program guide information, and video and audio information for all channels available on the given system.

In the embodiment of FIG. 1, an antenna 8 and low noise filter 9 function to receive the signal from a satellite source and to couple the signal to the receiving means of the terminal device 10. However, it is noted that the present invention is not limited to system providers which utilize satellite transmissions to broadcast signals. The novel system of the present invention could be readily used with system providers who supply signals via, for example, cable or telephone lines.

Upon receipt of the signal, tuner 12 functions to down-convert the received signal to an intermediate frequency ("IF"). The IF signal is then converted to a digital equivalent by the demodulator 13 and coupled to decoder 14, which provides forward error correction on the received signal.

Apparatus 10 also comprises a transport chip 11. The transport chip 11 preferably comprises a channel demultiplexer 16, a decryption unit 17 and an access card interface 18. The output of the decoder 14 is coupled to the channel demultiplexer 16, which functions to separate the audio and video information of each channel, and also separates the program guide information. Under control of the microprocessor 15, the channel demultiplexer 16 provides at its output port, the audio and video information of a selected channel or the program guide information.

Transport chip 11 further comprises an access card reader 19 which is coupled to the decryption unit 17 and the access card interface 18. The access card reader 19 operates in conjunction with the decryption unit 17 and the access card interface 18 to provide a means of preventing, for example, unauthorized pay-per-view movies from being ordered by children.

Apparatus 10 further comprises a modem 31 which allows the microprocessor 15 to be coupled to, for example, the public telephone network. The apparatus also includes microprocessor peripherals 33, such as serial and/or parallel data ports, and a power supply 35 for supplying power.

In the satellite system illustrated in FIG. 1, multiple transponders located in a satellite (not shown) are utilized to transmit channel information (e.g., audio, video) to the terminal device 10. Each transponder transmits information regarding multiple channels (i.e., multiple program sources, such as ABC, CBS, etc.). However, each transponder also transmits the program guide for every channel provided by the system provider on one of the frequencies available within the given transponder.

As such, regardless of which transponder the tuner 12 is tuned to, the program guide is available at the output of the channel demultiplexer 16. Under control of the microprocessor 15, the program guide is stored in random access memory ("RAM") 20, which is coupled to the channel demultiplexer 16. The system RAM 20 also functions to buffer the digital data associated with the audio and video data of a given channel.

The microprocessor 15 operates to periodically update the program guide stored in the system RAM 20. In the present embodiment, the program guide is updated one of two ways. First, the microprocessor 15 periodically analyzes the program guide transmitted by the provider to determine if the program guide has been updated. This can be accomplished, for example, by utilizing a flag byte which indicates that the program guide has been modified. If the program guide has been modified, the microprocessor 15 stores the updated guide in the system RAM 20. Second, as an independent process, the microprocessor 15 monitors an expiration date/time transmitted along with the program guide. Upon reaching the expiration date/time, the microprocessor 15 updates the program guide stored in system RAM 20 with the program guide currently being transmitted.

Returning to FIG. 1, the terminal device of the present invention further comprises a MPEG chip 22, for example, Part No. 64002, manufactured by LSI Logic. The MPEG chip 22 comprises a video decoder and on screen display generator 24, and an audio decoder 25. The MPEG chip 22 functions to decompress the audio and video data output by the channel demultiplexer 16, which is transmitted by the provider in a compressed format. The NTSC encoder 26 and audio subsystem 27 format the decompressed audio and video data, respectively, for display on, for example, a television receiver. The output drivers 28 function to transmit the audio and video information of a selected channel to the display screen of the television receiver.

In the event the subscriber selects to display the program guide, which can be accomplished by selecting the predefined button associated with the program guide, via front panel 30 or a remote control 40 creating a signal received by an IR receiver 42, the microprocessor 15 retrieves the program guide from system RAM 20, and then accesses a font table stored in memory. The microprocessor 15 then converts the program guide stored in memory 20 into displayable graphics data. The displayable graphics data is then coupled to the MPEG chip 22. As described above, the MPEG chip 22 in combination with NTSC encoder 26 and the output drivers 28, functions to write the program guide to the television receiver.

FIG. 2 illustrates an exemplary program guide produced in accordance with the present invention. As shown in FIG. 2, each screen of the program guide comprises approximately seven program sources and the corresponding programs. The program source and the programs being shown thereon are displayed on a single line comprising multiple cells of varying length. The first cell in each line indicates the program source and the channel number assigned to the source. In order to view additional program information, the viewer simply presses a designated key, for example, a page down key (i.e., scroll down key) and the foregoing process is repeated for the new program data to be displayed.

In accordance with the present invention, the apparatus 10 also allows the viewer to impose various restrictions on the programs available for viewing, as a method of, for example, imposing parental control over the programs available to children. The present invention provides a minimum of two methods of restricting viewing of programs.

The first method is referred to as the "rating limit" method. This method utilizes, for example, an extended version of the Motion Picture Association of America's "MPAA" ratings list, which is transmitted by the system provider as part of the program guide information. The MPAA ratings list aids in classifying the subject matter of programs. Each individual program event is provided with a rating, such as, for example, "G"—suitable for general audiences, "PG"—parental guidance suggested, and "NR"—not rated.

The apparatus of the present invention allows the viewer to restrict programs on the basis of its MPAA rating. For example, if the viewer does not wish any programs exceeding the rating of "PG" to be shown, the viewer, under menu control, programs the apparatus 10 to prevent the display of such shows. More specifically, the viewer first sets the maximum allowable rating via menus generated by the microprocessor 15. The microprocessor 15 then proceeds to prevent the display of any program having a rating higher than the maximum rating selected by the viewer. The microprocessor 15 performs this task by comparing the MPAA rating of the given program to the user-defined maximum rating, and then controlling the tuners 12 accordingly. For example, if a program should be restricted, the microprocessor prevents the tuner 12 from selecting the necessary channel. Of course, other methods of preventing the display of a restricted program are possible.

According to the second method, apparatus 10 also allows the viewer to restrict viewing by identifying specific channels and program names to be restricted, and/or by identifying specific times periods which should be restricted. Similar to the first method, the viewer inputs specific channels, program names and/or time periods to be restricted via, for example, user input means 40, and typically in response to menus generated by microprocessor 15. The microprocessor 15 records and stores the information input by the viewer, and then proceeds to prevent the display of any program event that satisfied the restriction criteria entered by the viewer.

Importantly, however, for each program restricted from viewing by either of the foregoing methods, the apparatus 10 of the present invention functions to generate a icon 50, displayed on the program guide, adjacent the restricted program, which identifies to the viewer that the program is available, but is currently restricted.

Figure 3:
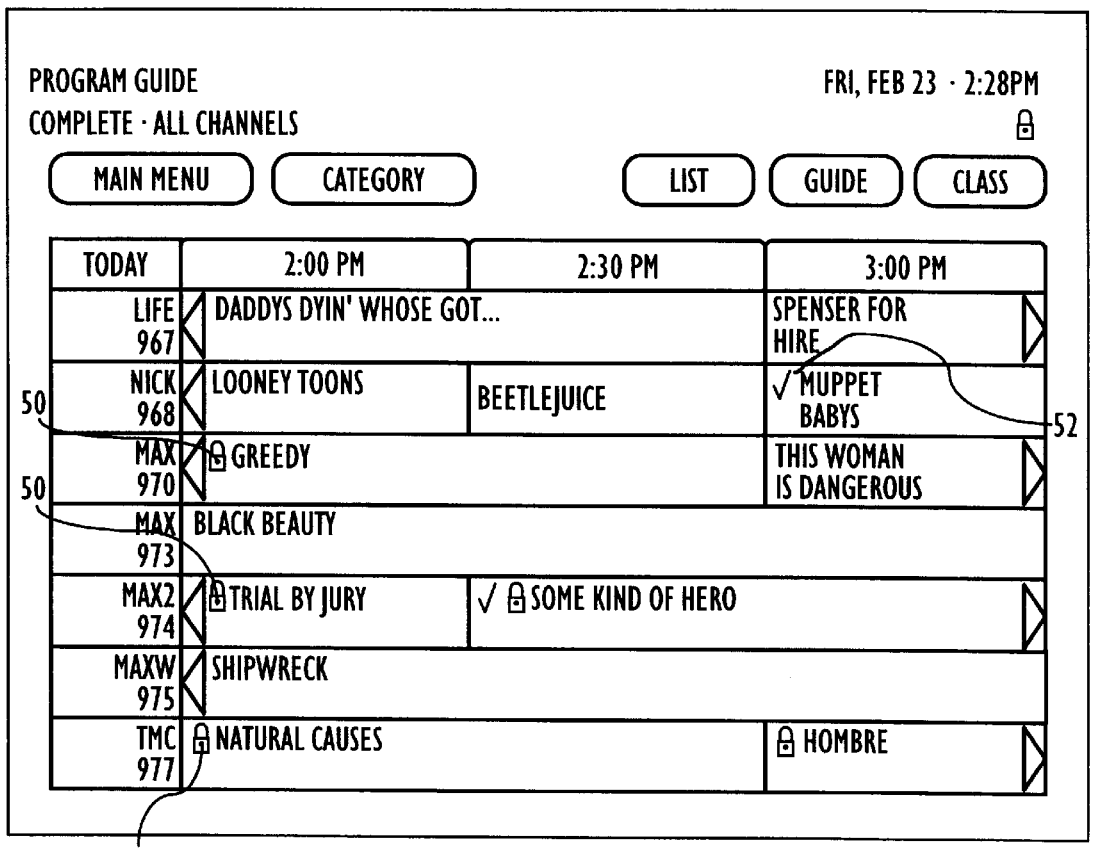
FIG. 3 illustrates an exemplary embodiment of program guides menus produced in accordance with the present invention.

More specifically, when commanded to generate the program guide, microprocessor 15 reviews all programs to be included in the guide. If any of the programs are restricted under either of the foregoing methods, the microprocessor 15 generates a "lock" icon 50 and functions to display the icon adjacent any restricted program, as shown in FIG. 3. The "lock" icon is stored as part of the aforementioned font table, and is recalled by the microprocessor 15 as required. The microprocessor 15 combines the data representing the icon with the program information associated with the restricted program, and then converts the combined data into displayable graphics data. As stated above, the displayable graphics data is then coupled to the MPEG chip 22 and subsequently displayed.

There are various methods for microprocessor 15 to generate the necessary icons. For example, as explained above, upon receiving a command to generate the program guide, the microprocessor 15 can compare the restriction criteria input by the viewer to determine which program events should be denoted with the "lock" icon 50. Alternatively, the microprocessor 15 can periodically review the program guide information stored in memory 20 so as to generate a restricted list. The restricted list identifies any program currently in the program guide which would be restricted under the viewer's current restriction criteria. Accordingly, when the program guide is created, any program on the restricted list would be provided/displayed with a "lock" icon 50.

Variations of the foregoing embodiment are possible. For example, icons can be utilized to indicate other viewer-selected options. For instance, a "check" mark icon 52 can be utilized to indicate that the viewer has commanded apparatus 10 to automatically tune to the "checked" program event at the appropriate time.

In another variation, different types of icons are utilized to convey the relevant information. For example, the icons 50,52 shown in FIG. 3 can be replaced with text, or any other suitable icon.

Thus, the icons of the present invention are utilized to represent the state of various user-selectable options, such as the "restriction" option and the "tune-to" option, as described above. The state of the option indicates whether or not the option has been selected or, in other words, active. For example, with regard to the "restriction" option, each given program event is either restricted or available for viewing. In the foregoing example, the absence of the icon represents the normal state (i.e., available for viewing). However, the reverse is also possible.

The method and apparatus of the present invention provides important advantages over the prior art. Most importantly, in the exemplary embodiment described above, the present invention allows the viewer to readily and easily identify if a program or channel has been restricted from viewing. As a result, the viewer has ready access to all available programs, and can modify the restricted list if he/she desires to view a restricted program.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed is:

1. A method of generating an on-screen program guide, said method comprising the steps of:
   providing a viewer interface whereby a viewer enters a selection criteria for selecting one or more program events based on content information associated with the program events;
   generating a program guide, said program guide comprising program source information and program event information for a plurality of program sources;
   comparing the selection criteria to the content information of the program events in the program guide;
   generating icons to be displayed adjacent said program event information for program events with content information matching the selection criteria; and
   simultaneously displaying the program source information, program event information and associated icons for the plurality of program sources.

2. The method of generating an on-screen program guide according to claim 1, wherein said selection criteria indicates whether a given program event is restricted from viewing.

3. The method of generating an on-screen program guide according to claim 2, wherein a lock symbol icon is displayed adjacent said program event information if a match between the selection criteria and content information indicates said program event is restricted from viewing.

4. The method of generating an on-screen program guide according to claim 1, wherein said selection criteria indicates whether a given program event has been selected for automatic tuning.

5. The method of generating an on-screen program guide according to claim 4, wherein a check symbol icon is displayed adjacent said program event information if a match between the selection criteria and content information indicates said program event has been selected for automatic tuning.

6. An apparatus for generating an on-screen program guide, said apparatus comprising:
   means for providing viewer interface whereby a viewer enters a selection criteria for selecting one or more program events based on content information associated with the program events;
   means for operating a program guide, said program guide comprising program source information and program event information for a plurality of program sources;
   means for comparing the selection criteria to the content information of the program events in the program guide;
   means for generating icons to be displayed adjacent said program event information for program events with content information matching the selection criteria; and
   means for simultaneously displaying the program source information, program event information and associated icons for the plurality of program sources.

7. The apparatus for generating an on-screen program guide according to claim 6, wherein said selection criteria indicates whether a given program event is restricted from viewing.

8. The apparatus for generating an on-screen program guide according to claim 7, wherein a lock symbol icon is displayed adjacent said program event information if a match between the selection criteria and content information indicates said program event is restricted from viewing.

9. The apparatus for generating an on-screen program guide according to claim 6, wherein said selection criteria indicates whether a given program event has been selected for automatic tuning.

10. The apparatus for generating an on-screen program guide according to claim 9, wherein a check symbol icon is displayed adjacent said program event information is a match between the selection criteria and the content information indicates said program event has been selected for automatic tuning.

11. The apparatus for generating an on-screen program guide according to claim 6, said apparatus further comprising:
   means for receiving a signal comprising said program source information and program event information;
   memory means for storing said program source information and said program event information;

user input means for allowing a user to program said selection criteria; and a system controller coupled to said memory means and said user input means, said system controller operative for generating said program guide and said icons.

12. The apparatus for generating an on-screen program guide according to claim 11, wherein said user input means comprises a remote control.

13. The apparatus for generating an on-screen program guide according to claim 1, wherein said content information for a given program event is an MPAA rating.

14. The apparatus for generating an on-screen program guide according to claim 6, wherein the content information for a given program event is an MPAA rating.

* * * * *